(12) United States Patent
Ramey et al.

(10) Patent No.: US 9,340,151 B2
(45) Date of Patent: May 17, 2016

(54) OPTICAL COUPLER FOR VEHICLE LIGHTING SYSTEMS

(71) Applicant: Federal-Mogul Corporation, Southfield, MI (US)

(72) Inventors: David Edward Ramey, Ypsilanti, MI (US); Linsheng Chen, Woodbury, MN (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 14/485,078

(22) Filed: Sep. 12, 2014

(65) Prior Publication Data

US 2015/0078030 A1    Mar. 19, 2015

Related U.S. Application Data

(60) Provisional application No. 61/877,361, filed on Sep. 13, 2013.

(51) Int. Cl.
*B60Q 3/00* (2006.01)
*F21V 8/00* (2006.01)
*G02B 6/32* (2006.01)
*G02B 6/38* (2006.01)
*G02B 6/28* (2006.01)

(52) U.S. Cl.
CPC .............. *B60Q 3/002* (2013.01); *G02B 6/0001* (2013.01); *G02B 6/32* (2013.01); *G02B 6/001* (2013.01); *G02B 6/0096* (2013.01); *G02B 6/2804* (2013.01); *G02B 6/3809* (2013.01)

(58) Field of Classification Search
None
See application file for complete search history.

(56) References Cited

U.S. PATENT DOCUMENTS

| 4,078,852 | A | * | 3/1978 | Lebduska | ................ G02B 6/32 385/33 |
| 4,135,783 | A | | 1/1979 | Kunze | |
| 5,359,684 | A | | 10/1994 | Hosokawa et al. | |
| 5,410,627 | A | * | 4/1995 | Hultermans | .......... B29C 70/845 385/45 |
| 5,666,448 | A | * | 9/1997 | Schoenwald | ............ G02B 6/32 359/636 |
| 2002/0181887 | A1 | * | 12/2002 | Lindsey | ................ G02B 6/262 385/61 |
| 2004/0105628 | A1 | | 6/2004 | Morse et al. | |
| 2005/0018971 | A1 | | 1/2005 | Lindsey | |

(Continued)

FOREIGN PATENT DOCUMENTS

JP          608811 A       1/1985

OTHER PUBLICATIONS

International Search Report for application No. PCT/US2014/055453, dated Dec. 19, 2014, 3 pages.

*Primary Examiner* — Ashok Patel
(74) *Attorney, Agent, or Firm* — Reising Ethington P.C.

(57) ABSTRACT

An optical coupler for a vehicle lighting system includes a housing having first and second openings, each opening having an optical axis passing through the opening into the housing, with the optical axes of the openings forming an obtuse angle. The optical coupler has one or more optics carried by the housing and arranged between the openings such that light entering the first opening along its optical axis passes through the one or more optics and exits through the second opening along the other optical axis. The optic(s) may include a first Fresnellian surface adjacent the first opening and a second Fresnellian surface adjacent the second opening such that light passing through the optical coupler from the first opening to the second opening passes through both Fresnellian surfaces and is redirected from the optical axis of the first opening to the optical axis of the second opening.

13 Claims, 4 Drawing Sheets

(56) References Cited

U.S. PATENT DOCUMENTS

| | | | |
|---|---|---|---|
| 2005/0171408 A1* | 8/2005 | Parker | A61B 17/02 600/249 |
| 2012/0033914 A1* | 2/2012 | Rosenberg | G02B 6/32 385/28 |
| 2015/0010273 A1* | 1/2015 | Oyagi | G02B 6/428 385/33 |

* cited by examiner

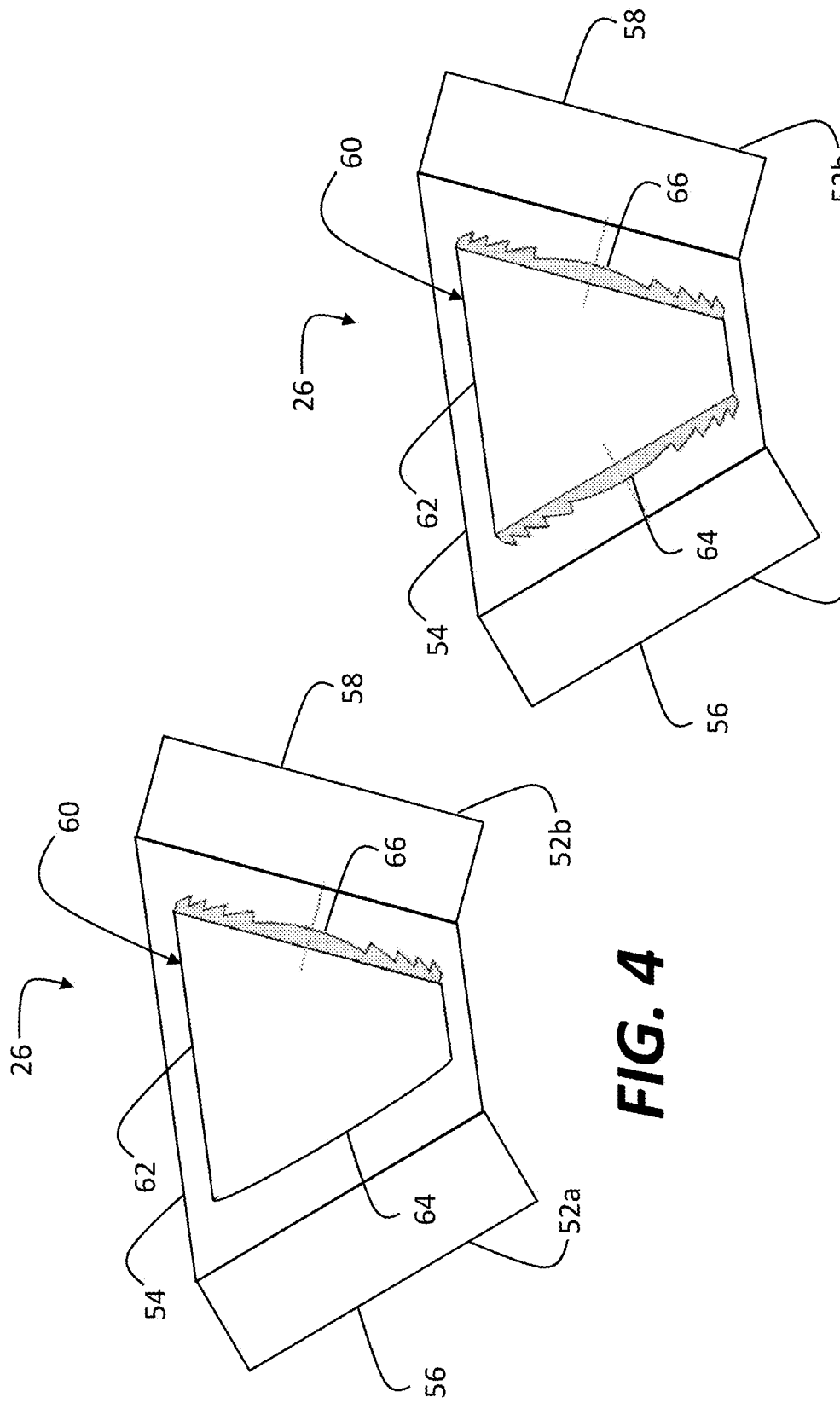

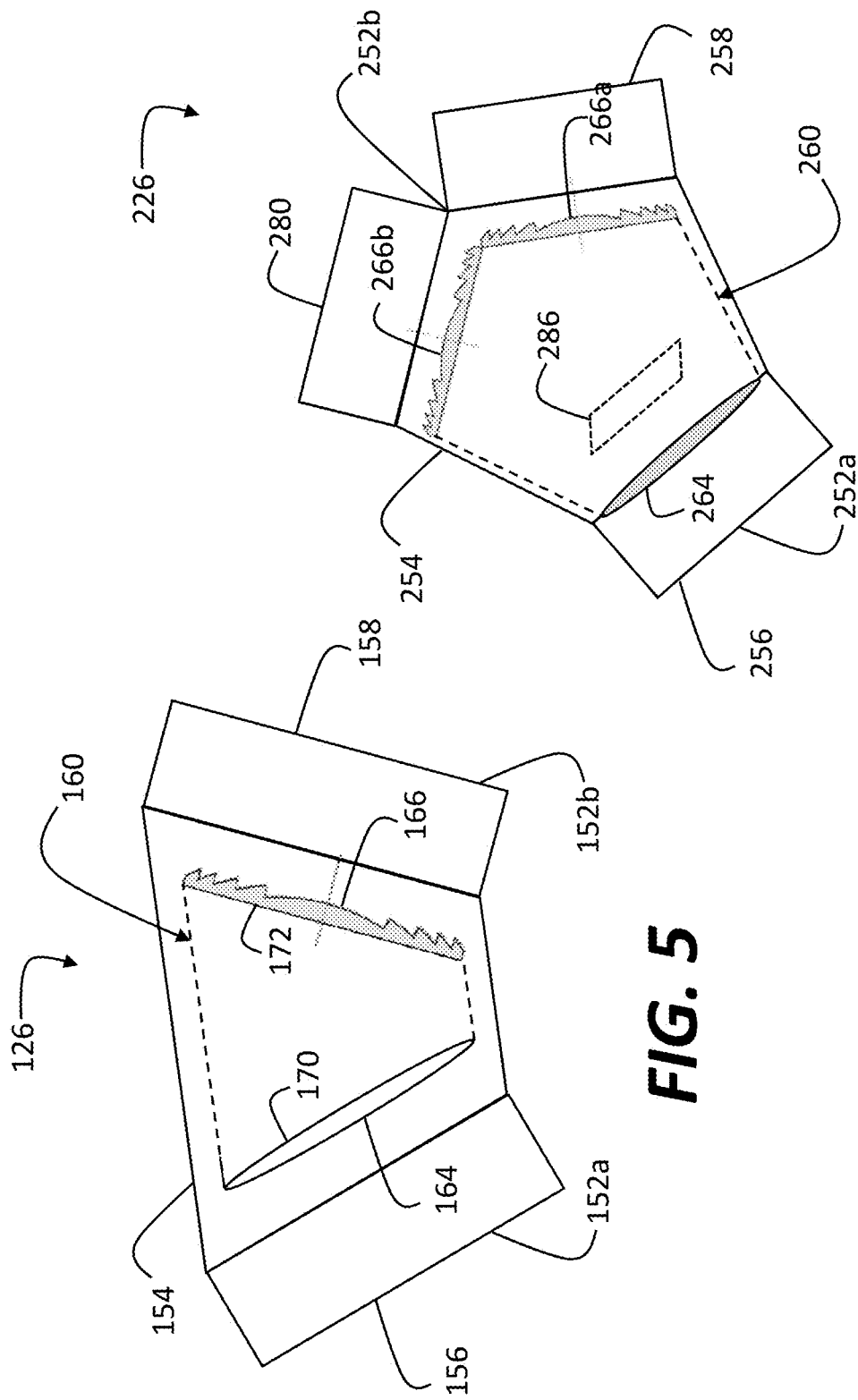

OPTICAL COUPLER FOR VEHICLE LIGHTING SYSTEMS

TECHNICAL FIELD

This invention generally relates to vehicle lighting using light guides and, in particular, to a coupler for vehicle light guides.

BACKGROUND

Optical couplers for light guides permit functional interconnection of different light guides (also referred to herein as waveguides or light pipes). Broadly, such couplers can include ones used for optical communication (e.g., digital data encoded into light pulses) as well as ones used for distributing illuminating light, and the design and considerations that go into each type can be very different. Vehicle interior lighting may utilize these latter types of couplers to distribute light from one or more sources into different locations of the vehicle for such purposes as feature or area lighting. See, for example, U.S. Pat. Nos. 6,419,379 and 6,234,439 which disclose the use of waveguides for light distribution within a vehicle.

One use for an optical coupler in a vehicle lighting application is disclosed in U.S. Pat. No. 7,027,691, in which a light coupler is used to optically couple light from a plurality of light sources into an optical fiber. In a non-automotive application, U.S. Pat. No. 4,961,622 discloses an optical coupler having a housing in which are disposed optical elements that direct light coming into the housing at a first end via a first optical fiber into a plurality of optical fibers that exit the housing at a second end.

Unlike the more flexibly type of optical fibers shown in U.S. Pat. No. 4,961,622, automotive applications often involve the use of rigid acrylic or other transmissive waveguides that route light underneath or along vehicle interior trim components, requiring lengths and bends for which molding or extruding of the overall waveguide as a single component might not be the most flexible or cost effective from a manufacturing standpoint.

SUMMARY

In accordance with one aspect of the invention, there is provided an optical coupler that includes a housing having at least two openings, each opening configured to receive an end of a light pipe positioned along an optical axis that is angularly aligned with the optical axis of the other opening. The optical coupler also includes one or more collimating optics carried by the housing and being arranged between the openings such that light entering one of the openings along one of the optical axes passes through the one or more optics and exits through the other opening along the other optical axis. In some embodiments the two openings are angularly offset from one another by an obtuse angle. This can permit coupling of light between light pipes that are not directly aligned with each other, such that a distributed lighting system can be implemented within a vehicle with the light routed along non-rectilinear paths.

The optical coupler may have one or more of the following features either alone or in any technically feasible combination:

The openings may include at least one input opening for receiving light and at least one output opening for transmitting redirected light.

The optic may be a Fresnel lens or otherwise include a Fresnellian surface.

The one or more optics may include first and second surfaces each facing a different one of the openings, with the first and second surfaces each having collimating optical elements. In some embodiments, the first and second surfaces may both be Fresnellian surfaces.

Each of the openings may have a diameter between 1-30 mm.

The openings may include first, second, and third openings, with the second and third openings having an acute angle therebetween and each forming an obtuse angle with the first opening. In some embodiments, the one or more optics may include surfaces adjacent each of the three openings with the surfaces adjacent the second and third openings comprising collimating optical elements.

In accordance with another aspect of the invention, there is provided a vehicle interior lighting system comprising the optical coupler defined above along with a first light pipe connected to the optical coupler at a first one of the openings, and a second light pipe connected to the optical coupler at a second one of the openings.

In accordance with yet another aspect of the invention, there is provided an optical coupler that includes a housing having first and second openings, each opening having an optical axis passing through the opening into the housing, with the optical axes of the openings forming an obtuse angle. The optical coupler also includes one or more optics carried by the housing and arranged between the openings such that light entering the first opening along its optical axis passes through the one or more optics and exits through the second opening along the other optical axis. The one or more optics includes a first Fresnellian surface adjacent the first opening and a second Fresnellian surface adjacent the second opening such that light passing through the optical coupler from the first opening to the second opening passes through both Fresnellian surfaces and is redirected from transmission along the optical axis of the first opening to transmission along the optical axis of the second opening. In some embodiments, the first and second openings have a diameter between 1-30 mm. And in some embodiments, the one or more optics comprises a single optical element. This optical coupler can be implemented as part of a vehicle interior lighting system comprising the optical coupler along with a first light pipe connected to the optical coupler at a first one of the openings, and a second light pipe connected to the optical coupler at a second one of the openings.

BRIEF DESCRIPTION OF THE DRAWINGS

One or more embodiments of the invention will hereinafter be described in conjunction with the appended drawings, wherein like designations denote like elements, and wherein:

FIG. 4 is a schematic view of an optical coupler;

FIG. 4a is a schematic view of a second embodiment of an optical coupler;

FIG. 5 is a schematic view of a third embodiment of an optical coupler; and

FIG. 6 is a schematic view of a fourth embodiment of an optical coupler.

DETAILED DESCRIPTION OF THE ILLUSTRATED EMBODIMENTS

Figure 1:
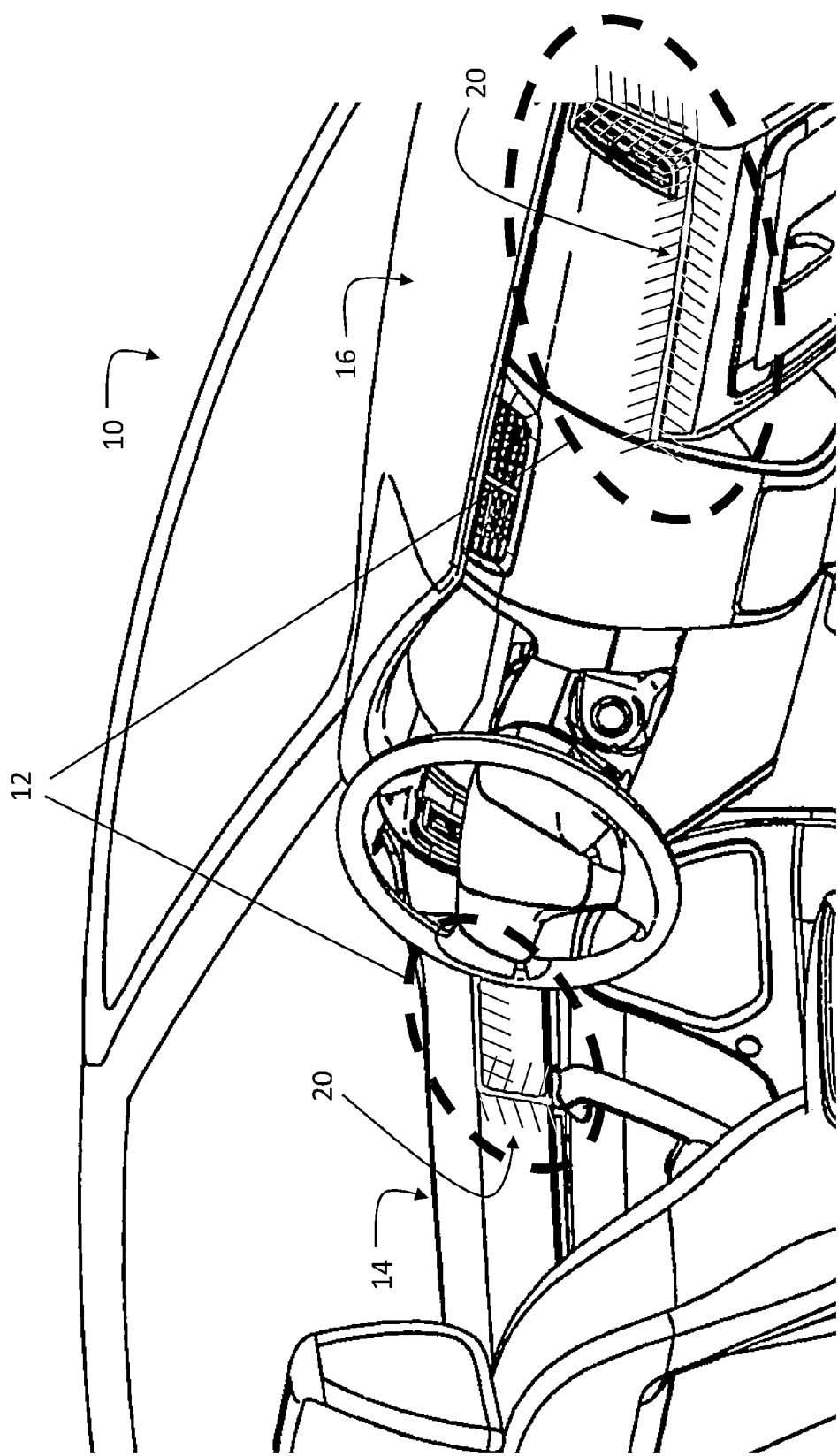
FIG. 1 is a perspective view of a portion of a vehicle interior having a plurality of light pipe assemblies located therein.

FIG. 1 illustrates a portion of a vehicle interior 10 having several interior lighting regions 12. These lighting regions 12 may include a door panel 14 and a vehicle instrument panel or dashboard 16; other examples not shown might include a floor area, a vehicle pillar, a headliner, or even the vehicle exterior (just to name a few). The illustrated lighting regions include lamps or light pipe assemblies 20 that include a light engine 22, one or more light pipes or light guides 24, and an optical coupler 26 assembled into the vehicle interior (see also FIG. 2). The following description generally pertains to the optical coupler 26 and coupling light pipes together using the optical coupler 26. Several implementations will be described hereafter.

Figure 2:
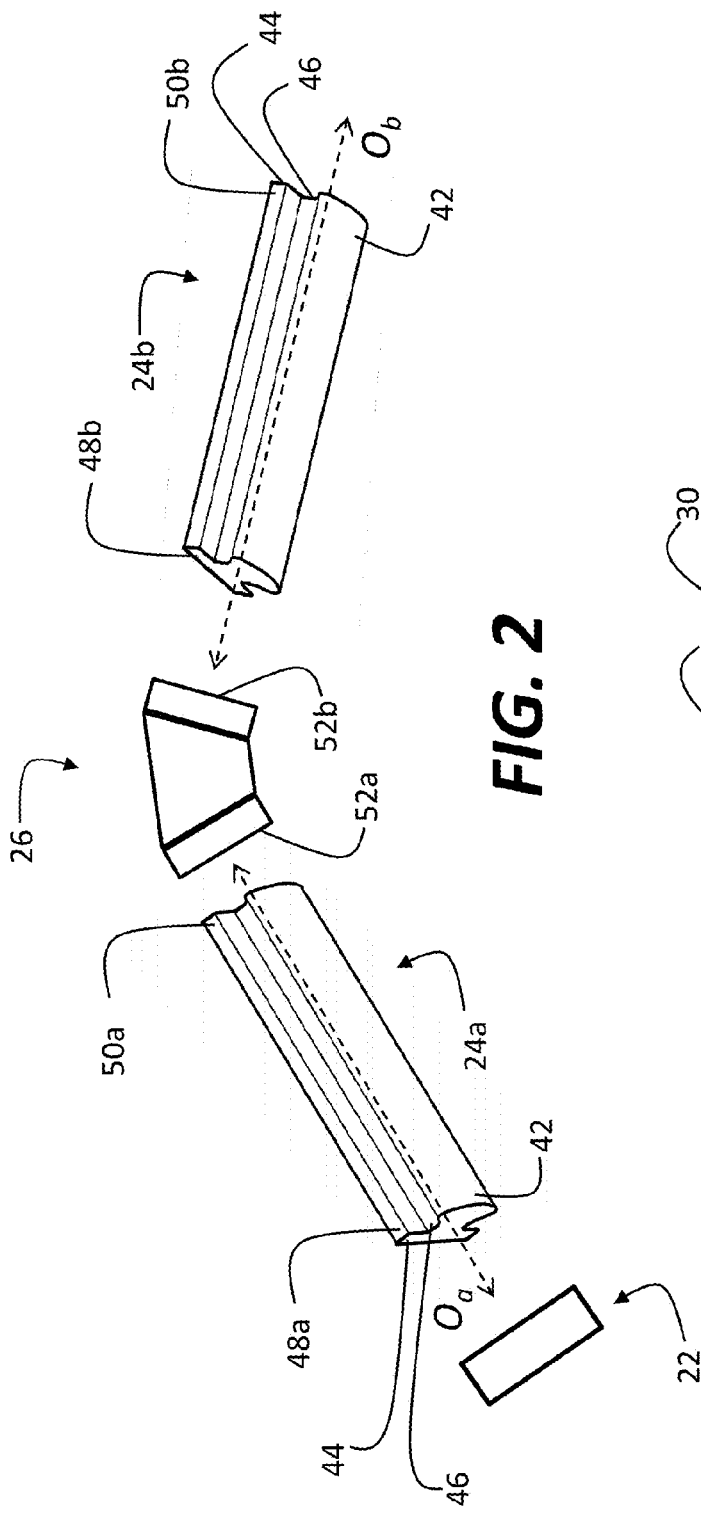
FIG. 2 is a partial, exploded schematic view of a light pipe assembly such as shown in FIG. 1 that includes a light pipe engine and an optical coupler.

FIG. 2 illustrates one example of a light pipe assembly 20 having a light engine 22 coupled to a first light pipe segment 24a and a second light pipe segment 24b coupled to the first segment 24a using the optical coupler 26. Each component of the assembly 20 will be discussed in greater detail below.

Figure 3:
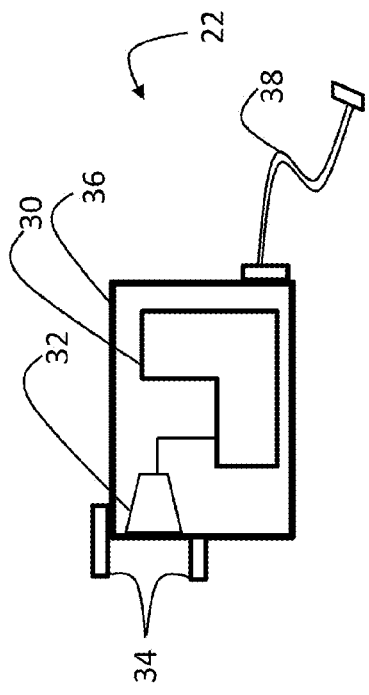
FIG. 3 is a schematic view of a light pipe engine.

As shown in greater detail in FIG. 3, the light engine 22 may be any device for providing light energy to the light pipe and may include an electrical circuit 30, one or more light sources 32, and a light engine connector 34. For example, in one implementation, the electrical circuit, the light source(s), and the connector are assembled on a printed circuit board (PCB) 36 having a harness 38 for coupling with an electrical system of a vehicle (not shown). The circuit, for example, may include a voltage regulator, controller, etc. Regardless, circuits for light sources are known to those skilled in the art. The light source(s) 32 may be any device for providing light, including light visible to the human eye or otherwise. Furthermore, the light source 32 may include light energy generated or created using varying technologies. For example, the light source may utilize incandescent, fluorescent, halogen, light-emitting diode (LED), high-intensity discharge (HID), or any other suitable technology. In the illustrated implementations, the light source(s) are LEDs. The light engine connector 34 may be any device for joining an end of the light pipe 24a in the vicinity of the light source 32 (e.g., on the PCB 36, so that light may be directed therethrough).

Returning to FIG. 2, the light pipe segments 24a, 24b include any optically conductive conduits for conveying and/or distributing light. The segments may be hollow or solid. In addition, their form, shape, and geometry may vary. In the illustrated examples, the segments 24a, 24b have a solid form and are generally straight or linear (however, they could also be curved or bent). The linear segments 24a, 24b are illustrated having optical axes $O_a$, $O_b$, respectively, that are aligned with the openings in the housing and that form an obtuse angle between them. The segments 24a, 24b may be composed of any suitable material including acrylic, polycarbonate (PC), and various clear plastics.

The illustrated light pipe segments may have any cross-sectional shape suitable for its intended purpose. In the example of FIG. 2, the segments 24a, 24b have a cross-sectional shape that includes a head 42 coupled to an installation feature 44 by a neck 46. The installation feature may be suitable for attaching or coupling the segments 24a, 24b to the vehicle interior 10 (e.g., to trim in the door panel 14). The head 42 may be at least partially transparent and suitable for conducting light from the light engine 22.

The light pipe segments 24a, 24b have a first end 48a, 48b and a second end 50a, 50b, respectively. The first end 48a of the first segment 24a may be configured to suitably connect to the light engine connector 34, and the second end 50a may be configured to suitably connect to a first end 52a of the optical coupler 26. The first end 48b of the second segment 24b may be configured to suitably connect to a second end 52b of the optical coupler, and the second end 50b may be configured to suitably connect to any other type of coupler such as a terminating or end coupler (e.g., having a reflective surface), another optical coupler similar to coupler 26, another light engine similar engine 22, just to name a few examples.

Now turning to the optical coupler 26, as shown in FIG. 4, the coupler may include a housing 54 having a first or input opening 56 configured to suitably receive and retain one light pipe segment at the first end 52a and a second or output opening 58 configured to suitably receive and retain another light pipe segment at the second end 52b and at least one collimating optic 60 carried by the housing. The collimating optic is arranged in the housing 54 relative to the openings 56, 58 so as to transmit light received by the optic from the input opening 56 to the output opening 58. The openings 56, 58 of the coupler may be configured to any suitable angle; however, in at least one embodiment, the coupler is configured to receive one light pipe segment having an optical axis at an obtuse angle (i.e, an angle greater than 90° and less than 180°) relative to another light pipe segment's optical axis (e.g., comparing the angle between $O_a$ and $O_b$). In at least one implementation, for example, in automotive interior applications, the diameter of the first and second openings 56, 58 may be between 1-30 millimeters (mm). In other implementations, it may be larger.

The optic 60 of the optical coupler 26 may be any suitable optical lens or device for collimating light received from one or more light pipes and transmitted into one or more light pipes. The optic may be a lens having a body 62 comprising a receiving surface 64 for receiving light rays via the first opening 56 and a transmitting surface 66 for transmitting light rays via the second opening 58. The receiving surface 64 may be flat, angular, or otherwise curved and may be any suitable shape to internally direct light rays within the body 62 at the transmitting surface. In the illustrated example, the surface 64 is convexly curved outwardly of the body 62; however, this is merely one example. The transmitting surface 66 may be flat, angular, or otherwise curved and may be any suitably shaped surface to collimate light rays into the second segment 24b thereby minimizing light leakage due to the bend or reflection. In the illustrated example, the transmitting surface is shaped as a Fresnel lens which provides optical elements at the surface 66 to collimate the light exiting the optic 62. The design and shape of the Fresnellian, transmitting surface 66 may vary depending on various factors (e.g., the angle between the axes $O_a$ and $O_b$, the shape of the receiving surface 64, the length of the optic body 62, etc.).

During operation of the light pipe assembly 20, light rays or light energy may be projected from the light source 32 into the first end 48a of the light pipe segment 24a. The light rays may generally transmit or travel the length of the light pipe segment towards the second end 50a; however, some light may be outwardly directed or reflected (e.g., exiting the segment via the head 42). Any light reaching the second end 50a may be received via the opening 56 of the optical coupler 26. The light rays may pass through the optic 62 (e.g., enter the receiving surface 64, pass through the body 62, and exit the transmitting surface 66) and be received by the second segment 24b. Based on the collimating features of the optic 62, light losses may be minimized or eliminated in the coupler—i.e., light rays entering the optical coupler 26 may all generally pass into the second segment 24b. Further, this may be accomplished without mirrors or moving components.

Thus, the light pipe assembly 20 for a vehicle interior 10 may be assembled without bending light pipes. Bending light pipes rather than using the coupler 26 may expend undesired time and resources. For example, to bend the light pipe, it may first need to be warmed within a predetermined temperature range (at least in a localized area); thereafter, the pipe may undergo the bending or shaping process. Afterwards, the light pipe may need to be cooled or cured. Complications or damage to the light pipe may arise from a failure to warm the light pipe within the prescribed temperature or to properly cool it. Thus, use of the coupler 26 may mitigate this risk and expense.

Other implementations of the optical coupler also exist. For example, the receiving surface may also be a Fresnellian surface as shown in FIG. 4a. In this embodiment, the coupler 26a is the same as coupler 26 of FIG. 4 except that the one surface 64 is a Fresnellian surface similar to or the same as that of the other surface 66 of the optic 60. Thus, this embodiment utilizes a pair of Fresnel lens elements (either as a unitary optic or separate optics) for both the receiving and transmitting surfaces of the optic, while bending the light at an obtuse angle.

Or for example, as shown in FIG. 5, the optical coupler 126 may include an optic 160 that has a plurality of lenses 170, 172. The lens 170 may project light rays to the lens 172. The lens 170 may have a receiving surface 164 and may be convexly shaped. And the lens 170 may be a Fresnel lens having a transmitting surface 166. (In FIGS. 5-6, like reference numerals indicate like or similar elements.)

In another embodiment, the optical coupler 226 shown in FIG. 6 may receive light rays via one light pipe and provide some of those light rays to each of two different light pipes. The coupler 226 may include a generally Y-shaped housing 254 having a first opening 256 at a first end 252a, and a second opening 258 and a third opening 280 at a second end 252b. The first opening 256 may be configured to suitably receive and retain one light pipe segment. Similarly, the second and third openings 258, 280 may be configured to suitably each receive and retain other light pipe segments. As shown, the first opening 256 forms an obtuse angle with each of the second and third openings 258, 260, and those second and third openings have an acute angle between them.

An optic 260 of the coupler 226 may include a single lens having various shaped surfaces (e.g., a receiving surface 264 and two transmitting surfaces 266a, 266b) or may include a plurality of lenses similar to that shown in FIG. 5. In some implementations, the optic 260 may include a beam splitter 286 to segregate light for transmission through the transmitting surfaces 266a, 266b.

Other variations of the embodiment shown in FIG. 6 also exist. For example, the light may be split into three or more directions (e.g., a 3-to-1 housing, a 4-to-1 housing, etc.). In addition, there may be multiple light inputs and one or more light outputs (e.g., a 2-to-1 housing, a 3-to-1 housing, a 3-to-2 housing, etc.).

Thus, there has been disclosed a light pipe assembly having the optical coupler 26. The assembly 20 may be used to connect segments of light pipe together at various angles for assembly, e.g., into a vehicle interior. By connecting two or more light pipes to one another using the optical coupler 26, time and expense can be saved—e.g., eliminating the need to bend or form light pipes into particular shapes.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An optical coupler, comprising:
a housing having at least two openings, each opening configured to receive an end of a light pipe positioned along an optical axis, wherein at least two of the optical axes at the openings are angularly offset from one another; and
a lens body coupled to the housing, the lens body having at least one receiving surface oriented toward one of the openings and at least one transmitting surface oriented toward another of the openings, wherein the at least one receiving surface comprises a collimating optic and the at least one transmitting surface comprises another collimating optic, wherein the collimating optics are arranged so that as light enters the at least one receiving surface from one of the light pipes, it is redirected through the lens body to exit through the at least one transmitting surface and into another light pipe.

2. An optical coupler as defined in claim 1, wherein the angular offset is an obtuse angle.

3. A vehicle interior lighting system comprising the optical coupler defined in claim 1, a first light pipe connected to the optical coupler at a first one of the openings, and a second light pipe connected to the optical coupler at a second one of the openings, wherein the first and second light pipes are adapted to emit light radially outwardly in at least one direction to illuminate a portion of a vehicle interior.

4. An optical coupler as defined in claim 1, wherein at least one of the collimating optics comprises a Fresnellian surface.

5. An optical coupler as defined in claim 1, wherein the at least two openings are sized to receive the collimating optics of the lens body.

6. An optical coupler as defined in claim 1, wherein the lens body and at least one of the collimating optics are formed in the same piece of material, wherein at least one of the collimating optics comprises a Fresnellian surface.

7. An optical coupler as defined in claim 1, wherein each of the at least two openings have a diameter between 1-30 mm.

8. An optical coupler as defined in claim 1, wherein the at least two openings comprise first, second, and third openings, with the second and third openings having an acute angle therebetween and each forming an obtuse angle with the first opening.

9. An optical coupler as defined in claim 8, wherein the one or more optics include surfaces adjacent each of the three openings with the surfaces adjacent the second and third openings comprising collimating optical elements.

10. An optical coupler, comprising:

a housing having first and second openings, each opening configured to receive an end of a light pipe positioned along an optical axis, wherein at least two of the optical axes at the openings are angularly offset from one another; and a lens body coupled to the housing, the lens body comprising two collimating optics, wherein one collimating optic comprises a first Fresnellian surface oriented toward the first opening and wherein another collimating optic comprises a second Fresnellian surface oriented toward the second opening, wherein the first and second Fresnellian surfaces are arranged so that as light from one of the light pipes enters the collimating optic having the first Fresnellian surface, it is redirected through the lens body to exit through the collimating optic having the second Fresnellian surface and into another light pipe.

11. A vehicle interior lighting system comprising the optical coupler of claim 10, a first light pipe connected to the optical coupler at the first opening, and a second light pipe connected to the optical coupler at the second opening, wherein the first and second light pipes are adapted to emit light radially outwardly in at least one direction to illuminate a portion of a vehicle interior.

12. An optical coupler as defined in claim 10, wherein each of the first and second openings have a diameter between 1-30 mm.

13. An optical coupler as defined in claim 10, wherein the lens body and the two collimating optics are formed in a single piece of material having the Fresnellian surfaces facing radially outwardly.

* * * * *